(12) United States Patent
Lindley

(10) Patent No.: US 8,296,724 B2
(45) Date of Patent: Oct. 23, 2012

(54) SOFTWARE DEFECT FORECASTING SYSTEM

(75) Inventor: Joe H. Lindley, Garland, TX (US)

(73) Assignee: Raytheon Company, Waltham, MA (US)

( * ) Notice: Subject to any disclaimer, the term of this patent is extended or adjusted under 35 U.S.C. 154(b) by 921 days.

(21) Appl. No.: 12/354,605

(22) Filed: Jan. 15, 2009

(65) Prior Publication Data

US 2010/0180259 A1 Jul. 15, 2010

(51) Int. Cl.
*G06F 9/44* (2006.01)
(52) U.S. Cl. ......................................................... 717/104
(58) Field of Classification Search .................... 717/124
See application file for complete search history.

(56) References Cited

U.S. PATENT DOCUMENTS

| 5,918,219 | A | 6/1999 | Isherwood |
| 6,519,763 | B1 | 2/2003 | Kaufer et al. |
| 6,546,506 | B1 * | 4/2003 | Lewis ........................ 714/38.1 |
| 6,715,130 | B1 | 3/2004 | Eiche et al. |
| 6,938,007 | B1 | 8/2005 | Iulianello et al. |
| 6,973,415 | B1 * | 12/2005 | Saghier et al. ................ 702/186 |
| 7,318,039 | B2 | 1/2008 | Yokota et al. |
| 7,328,202 | B2 | 2/2008 | Huang et al. |
| 7,350,185 | B2 | 3/2008 | Sparago et al. |
| 7,366,680 | B1 | 4/2008 | Creel et al. |
| 7,464,119 | B1 | 12/2008 | Akram et al. |
| 2003/0070157 | A1 | 4/2003 | Adams et al. |
| 2003/0135399 | A1 | 7/2003 | Ahamparam et al. |
| 2004/0010441 | A1 | 1/2004 | Nandigama et al. |
| 2006/0026464 | A1 * | 2/2006 | Atkin et al. ..................... 714/38 |

OTHER PUBLICATIONS

Martin Neil and Norman Fenton, "Improved Software Defect Prediction" (http://citeseerx.ist.psu.edu/viewdoc/summary?doi=10.1.1.144.4517).*
Paul Luo Li et al. "Forecasting Field Defect Rates Using a Combined Time-based and Metrics-based Approach: a Case Study of OpenBSD" (http://repository.cmu.edu/isr/123/).*

* cited by examiner

*Primary Examiner* — Don Wong
*Assistant Examiner* — Deric Ortiz
(74) *Attorney, Agent, or Firm* — Schwegman Lundberg & Woessner, P.A.

(57) ABSTRACT

According to one embodiment, a software defect forecasting system comprises a software forecasting tool operable to receive a number of attributes associated with a software development project from a user interface. The attributes are associated with a software development project in which a software product is developed over a period of time. The attributes are received prior to the beginning of the software development project such that an anticipated quantity of defects may be estimated prior to the beginning of the software development project. Moreover, the software defect forecasting system may estimate the anticipated quantity of defects for some, most, or all of the various development phases of the software development project.

18 Claims, 3 Drawing Sheets

SOFTWARE DEFECT FORECASTING SYSTEM

TECHNICAL FIELD OF THE DISCLOSURE

This disclosure generally relates to software development, and more particularly, to a software defect forecasting system and a method of operating the same.

BACKGROUND OF THE DISCLOSURE

Software executed by computers may range from relatively simple organic software to complex software having many source lines of code involving the development efforts of numerous personnel. To produce a software product having an acceptable level of quality, the work of numerous personnel should be conducted in a generally coordinated manner. A common practice implemented by many software development organizations has been to conduct peer reviews in which development personnel review one another's work to remove defects and hence ensure compliance with applicable specifications, commonly accepted coding style, and overall functionality of the software product. Some software development organizations may monitor the quantity of defects removed with peer reviews and by other techniques throughout development to increase the likelihood that enough defects have been removed to produce a software product with an acceptable level of quality.

SUMMARY OF THE DISCLOSURE

According to one embodiment, a software defect forecasting system comprises a software forecasting tool operable to receive a number of attributes associated with a software development project from a user interface. The attributes are associated with a software development project in which a software product is developed over a period of time. The attributes are received prior to the beginning of the software development project such that an anticipated quantity of incurred defects may be estimated prior to the beginning of the software development project. Moreover, the software defect forecasting system may estimate the anticipated quantity of defects for some, most, or all of the various development phases of the software development project.

Some embodiments of the disclosure may provide numerous technical advantages. For example, one embodiment of the software defect forecasting system may predict defects that may be incurred by a software project before the beginning of the software project. Known software cost estimation programs estimate an overall level of effort that may be applied to an upcoming software project; however, they do not estimate a quantity of defects that may be incurred during an upcoming software project. Estimation of incurred defects may, therefore, provide relatively greater accuracy of forecasts for a software development project than provided by known software cost estimation systems. The software defect forecasting system uses attributes known about the software development project and/or attributes known about other previous software development projects to estimate both a count of the anticipated software defects that may be incurred, and optionally the time frame such as weeks, months, or phases of the projects at which they will be incurred. Knowledge of the anticipated quantity and timing of software defects may provide relatively greater financial forecasting accuracy for the software development project. In some embodiments, knowledge of the anticipated quantity of incurred software defects (both as a total and at various points in development) may also prompt management personnel to provide preventative or preliminary measures to alleviate hindrances to the software development project.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Software generated for relatively complex computing systems may require the efforts of numerous personnel. The efforts of these personnel should be coordinated in a systematic manner to ensure adequacy of design and quality of software product produced. One approach to enhancing the quality of a software product has been to monitor the quantity of defects found during the course of a given software development project. If a sufficient quantity of defects are removed early and throughout the development of the product, its is likely that only a small, acceptable quantity of defects will remain in the product at project completion; and excessive costs for removing defects late in the project will be avoided. A key necessity for using this approach is to have a reasonably good forecast of the quantity of defects that should be incurred as development progresses (for example each week or month), or during some or each development phase of the software development project.

The rate at which software defects are incurred during development typically follows a characteristic pattern: ramping up and then dropping slowly over time until relatively few defects are found. This pattern may be characterized by various types of defect load models, such as a Rayleigh model, a Gompertz model, or a phase detection profile model. Defect load models may accept as input, an estimate of the total quantity of defects that may be found during software development and distribute that total over the duration of software development to aid in planning.

The Rayleigh model and the Gompertz defect load models use various types of mathematical algorithms to model changes in the defect detection rate (for example, the quantity of defects found weekly or monthly) during a software development project.

The phase profile defect load model may segment the estimate of the total defects to be found into the various phases of software development. the proportion of the defects allocated for each phase may be based upon assumptions or analysis of prior software development projects.

Figure 1:
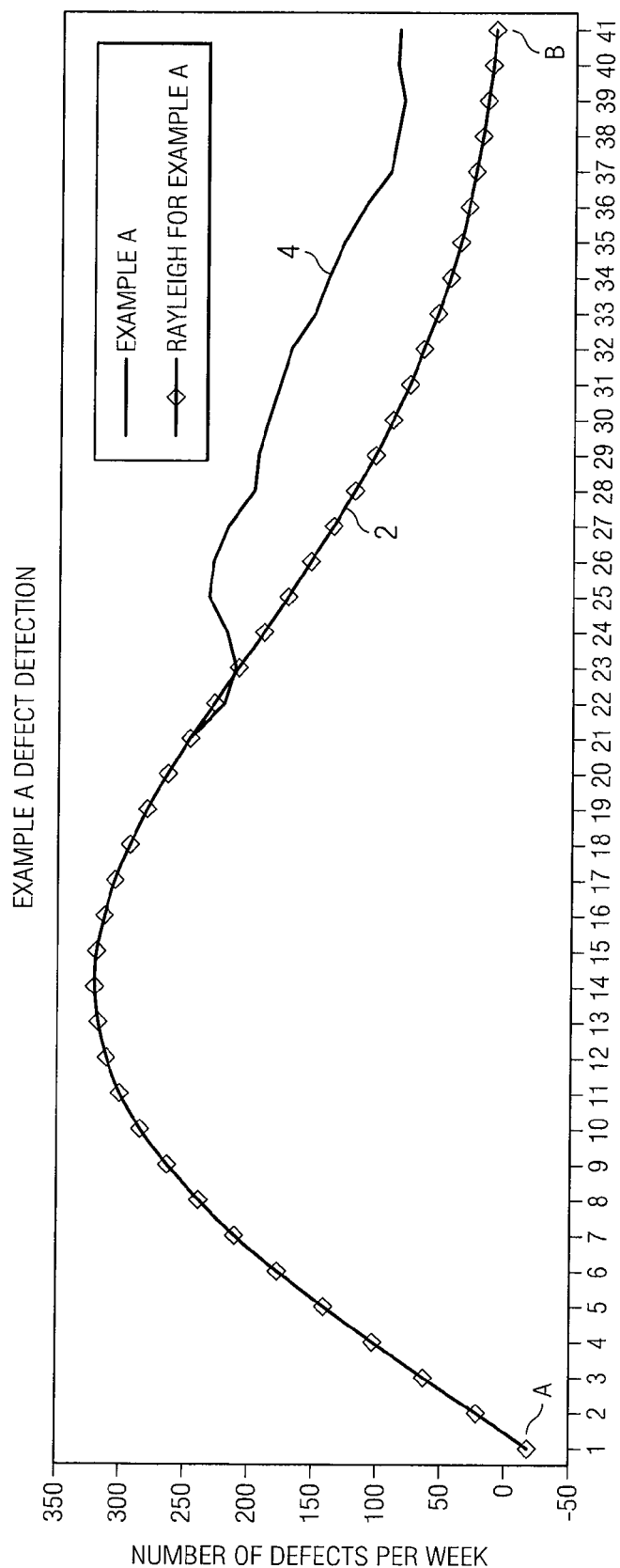
FIG. 1 is a graph showing an example defect load model that is empirically matched to an actual software defect curve representing a quantity of software defects found during development of an example software development project.

FIG. 1 is a graph showing an example Rayleigh curve model 2 that is empirically matched to an actual software defect curve 4 representing software defects found during development of a particular software development project. Point A represents the beginning of formal testing and point B represents an arbitrary point prior to completion of formal testing. As can be seen, the quantity of software defects detected each week increases to a maximum level and then tapers off as testing proceeds.

Figure 2:
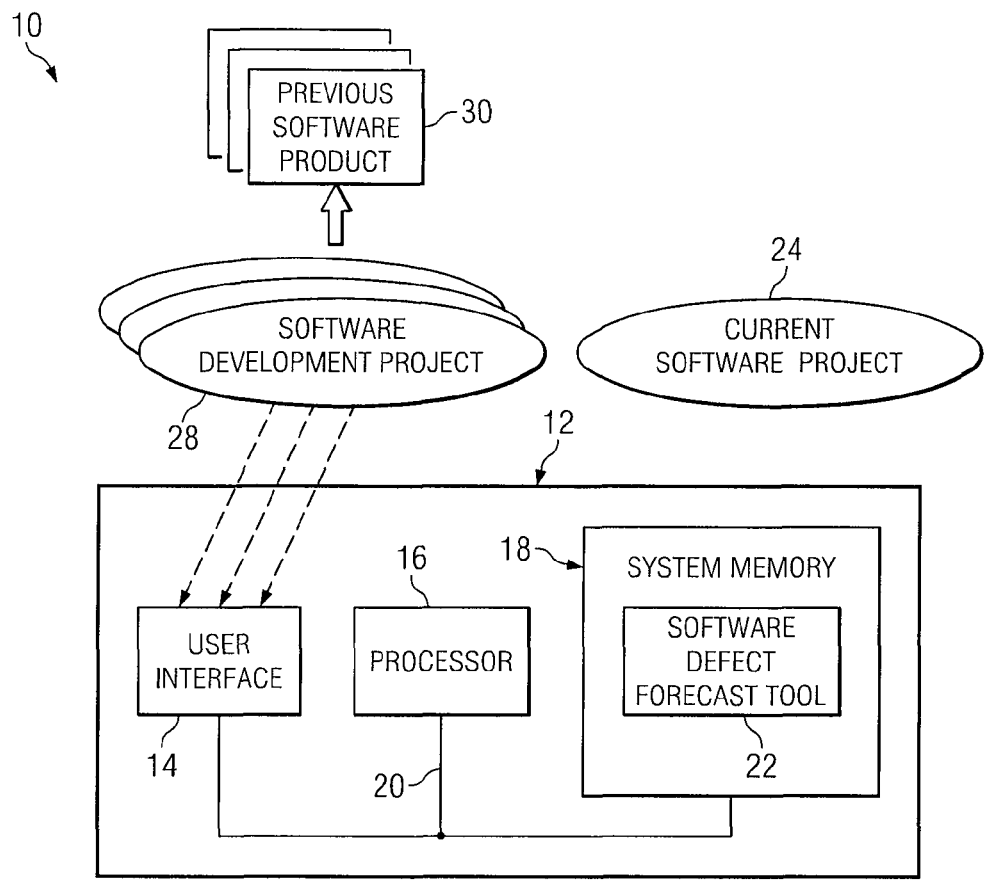
FIG. 2 is a block diagram showing one embodiment of a software defect forecasting system according to the teachings of the present disclosure.

FIG. 2 shows one embodiment of a software defect forecasting system 10 that may provide a solution to this problem and other problems. Software defect forecasting system 10 includes a computing system 12 having a user interface 14, a processor 16, and a system memory 18 coupled together by a system bus 20 as shown. System memory 18 stores a software defect forecast tool 22 that is executable by processor 16 to receive attributes from a current software project 24 that produces a software product 26 and/or one or more previous software projects 28 that produces one or more corresponding previous software products 30. From these attributes, software defect forecast tool 22 estimates, prior to start of current software project 24, a quantity of defects that may be found during development of the software product, along with, as an option, the expected timing at which varying quantities of defects will be incurred, for example, by week, month, or development phase.

Certain embodiments of software defect forecast tool 22 may provide one or more benefits over known software defect estimation systems. For example, because the anticipated quantity of software defects may be estimated prior to the beginning of current software project 24, a forecast of the software project 24 may be managed with a relatively greater degree of accuracy. The forecast may in turn, provide improved anticipated costs of the software development project over other known defect estimation systems. This enhanced accuracy may also provide improved financial management of current software project 24 in some embodiments.

Computing system 12 may include any suitable type of computing system having processor 16 that executes instructions stored in system memory 18. Computing system 12 may comprise a network coupled computing system or a stand-alone computing system. In one embodiment, a stand-alone computer system may be any suitable computing system, such as a personal computer, laptop computer, or mainframe computer. In another embodiment, computing system 12 configured as a network computing system may be a number of computer systems coupled together via a network, such as a local area network (LAN), a metropolitan area network (MAN), or a wide area network (WAN). A network computing system may enable the user interface 14 configured on one computing system to access the software defect forecasting system 10 implemented on another computing system.

User interface 14 may receive attributes associated with current software project 24. In other embodiments, attributes associated with current software project 24 may be received from another software program executed on computing system 12. In a particular embodiment in which user interface 14 receives these attributes, user interface 14 may include one or more input devices, such as a keyboard and/or a mouse for inputting attributes and a display, such as a cathode ray tube (CRT) or liquid crystal display (LCD) for view of entered attributes.

Software defect forecast tool 22 includes a set of instructions that are stored in system memory 18 and executed by processor 16 of computing system 12. Software defect forecast tool 22 may provide an estimated quantity of defects that can be used directly or used as an input to any suitable defect load model. A defect load model generally refers to a mathematical representation of the expected, varying rate (for example, defects per week or defects per month) at which software defects will be found throughout the course of a development project or the quantity of defects that will be incurred during each development phase of a particular software development project. In many cases, software development project 24 may include several development phases, such as a requirements phase, a design phase, and/or a coding phase.

Any suitable defect load model may be used that sufficiently models the behavior of current software project 24. In one embodiment, software defect forecast tool 22 incorporates a defect load model that is empirically matched to one or more previous software development projects. In this manner, software defect forecast tool 22 may be tailored for operation with any software development organization.

In one embodiment, the estimate of the expected quantity of software defects may be based upon a logarithmic model. In another embodiment, software defect forecast tool 22 may estimate the quantity of software defects according to the following equation:

$$\text{Estimated Defect Quantity} = fq\text{Constant} + fq\ln * \ln(\epsilon\,(fq\textit{Eff}/\text{Rwk\_Hrs\_per\_Defect}))$$

Where:

fqConstant represents a bias for the equation;

fq ln represents a product used to scale up/down the logarithmic term;

$\epsilon$ represents the natural exponent generally denoted by the Greek letter epsilon;

fqEff represents a logarithmic factor which adjusts the defect load based on the independent variable;

ln represents the natural logarithm function to be applied to its operand; and

Rwk_Hrs_per_Defect represents the time to fix software defects divided by the quantity of software defects fixed.

The variables fqConstant, fq ln, and fqEff are constants that may be periodically tailored to empirically match the defect load model to actual results from previous software development projects. That is, the values provided for fqConstant, fq ln, and/or fqEff may be adjusted to match defects found during one or more previous software development projects using a suitable process, such as a least mean squares (LMS) curve matching process. In one particular example, fqConstant may be set to 10.089, fq ln may be set to −3.346, and fqEff may be set to 7.042. By adjusting fqConstant, fq ln, and/or fqEff on an ongoing basis over a number of software development projects, software defect forecast tool 22 may estimate defects in a reasonably accurate manner.

Software defect forecast tool 22 may use the variable Rwk_Hrs_per_Defect provided as a leading indicator or a lagging indicator to estimate the quantity of software defects. Rwk_Hrs_per_Defect provided as a leading indicator may be derived from attributes associated with current software project 24. Conversely, Rwk_Hrs_per_Defect provided as a lagging indicator may be derived from attributes associated with one or more previous software projects 28 or during execution of current software project 24. That is, software defect forecast tool 22 may use Rwk_Hrs_per_Defect provided as a lagging indicator in which measurements are obtained from work already performed while Rwk_Hrs_per_Defect provided as a leading indicator may obtain estimated values of future development work.

The Rwk_Hrs_per_Defect value provided as a lagging indicator may use attributes from one or more previous software projects 28. In many cases, development personnel of one particular organization that are employed in current software project 24 have also been employed in previous software projects 28. Because personnel and the environment in which they work may remain relatively constant through a number of ongoing software projects, attributes associated with previous software project 28 may be used to determine the Rwk_Hrs_per_Defect value prior to the start of current software project 24. The lagging indicator within the context of this disclosure may refer to a collected average quantity of rework hours per defect. Rework refers to the testing phases of software development where defects are resolved by the author, designer, or programmer. For example, if a defect is found in the developed software, the software product is corrected during rework to meet the requirements in the documentation. Because lagging indicators are not collected until later phases of the project, they may be estimated for an ongoing project by directly using or adjusting the lagging indicator collected from a prior, similar project. Rwk_Hrs_per_Defect may be calculated by collecting the average quantity of hours required to resolve defects by the particular people working on the software project. For example, the lagging indicator may generally indicate that a particular software development project team generally requires four hours to resolve a defect. As another example, the lagging indicator may indicate that a particular software team generally requires forty hours to resolve a defect.

The variable Rwk_Hrs_per_Defect provided as a leading indicator may be derived from various attributes associated with current software project 24 prior to its execution. These attributes may include any measured attributes that indicate a competency and process maturity level of the organization and its personnel and the complexity of the development project. In one embodiment, the Rwk_Hrs_per_Defect variable may be provided as a leading indicator using a commercial off-the-shelf (COTS) software program, such as a COCOMO (constructive cost model) software package developed by Barry Boehm, or a SEER-SEM (System Evaluation and Estimation of Resources) software package provided by Galorath Incorporated of El Segundo, Calif.

The COCOMO software package or a portion of the COCOMO software package inputs a number of attributes and generates an effort multiplier (EM) in response to various received attributes, such as product attributes, hardware attributes, personnel attributes, and/or project attributes. Product attributes may include a required software reliability, a size of application database, and a complexity of the product. Hardware attributes may include a run-time performance constraints, memory constraints, a volatility of the virtual machine environment, and a required turnabout time. Personnel attributes may include an analyst capability, a software engineering capability, applications experience, virtual machine experience, and a programming language experience. Project attributes may include use of software tools, application of software engineering methods, and required development schedule. According to one embodiment, the variable Rwk_Hrs_per_Defect may be calculated from the generated effort multiplier (EM) value according to the equation:

$$Rwk\_Hrs\_per\_Defect = frwkConstant + FrwkFactor * \ln(Frwk\ Log\ Constant + (Frwk\ Log\ Factor * EM))$$

Where:
frwkConstant represents a bias for the equation;
frwkFactor represents a product used to scale up/down the logarithmic term;
frwk Log Constant represents a logarithmic factor which adjusts the result based on the independent variable;
ln represents the natural logarithm function to be applied to its operand; and
EM represents the effort multiplier value generated by the COCOMO software package.

The variables frwkConstant, frwkFactor, and frwk Log Constant are constants that may be periodically tailored to empirically match the equation to actual results from previous software development projects. In one particular example, frwk Log Constant may be set to −0.027, frwkFactor may be set to −9.41, and frwk Log Constant may be set to 1.16.

Figure 3:
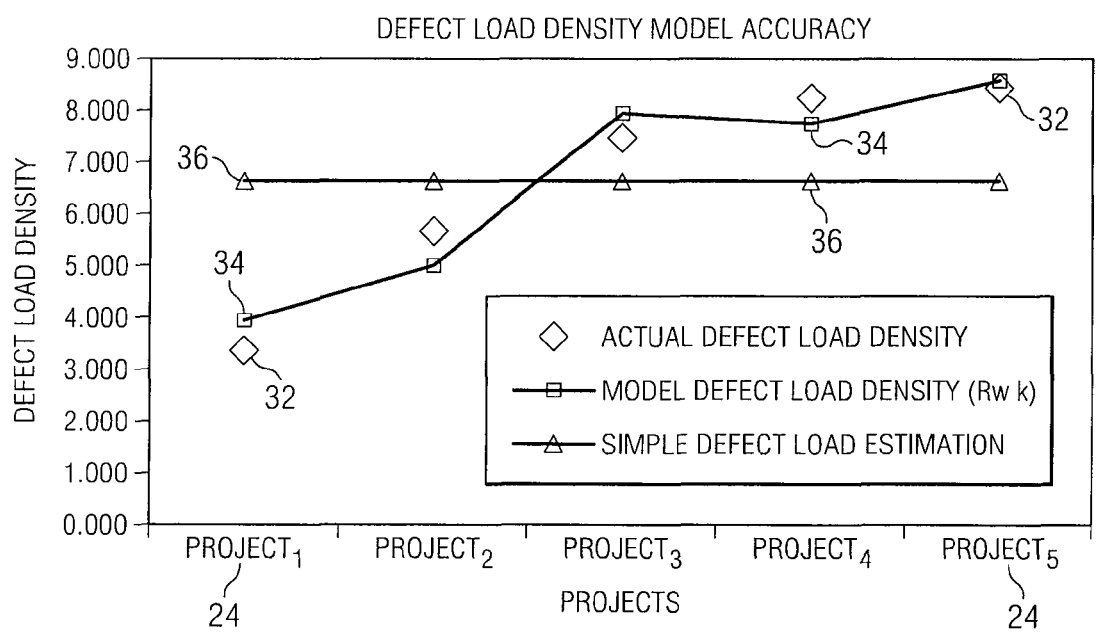
FIG. 3 is a chart showing the relative accuracy provided by software defect forecasting system of FIG. 2 when utilized in conjunction with several ongoing software development projects.

FIG. 3 is a chart showing the relative accuracy provided by one embodiment of the software defect forecast tool 22 when utilized in conjunction with several ongoing current software projects 24. Symbols 32 represent an actual defect load density of current software projects 24 that are measured at the conclusion of the software project. Symbols 34 represent an estimated defect load density provided by software defect forecast system 10. Symbols 36 represent a simple defect load density that is typically used by known software development forecasting tools. In this particular figure, the defect load density refers to a quantity of software defects incurred over the entire software development project that has begun at the commencement of development and ends at the completion of formal testing. The defect load density refers to a quantity of software defects that have been normalized according to a determined thousand equivalent source lines of code (KESLOC) of its respective current software project 24. That is, defect load density may be given by the determined quantity of defects divided by a determined thousand equivalent source lines of code (KESLOC). As can be seen, software defect forecast tool 22 may provide increased accuracy over other known techniques for estimating a quantity of defects that may be found during the development of several software development projects 24.

Modifications, additions, or omissions may be made to software defect forecasting system 10 without departing from the scope of the disclosure. The components of software defect forecasting tool 22 may be integrated or separated. For example, the operations of software defect forecasting tool 22 may be performed by more, fewer, or other components. For example, the operations of software defect forecast tool 22 may be performed by a dedicated computing system, or may be performed by a computing system that performs other tasks. Additionally, operations of software defect forecasting tool 22 may be performed using any suitable logic comprising software, hardware, and/or other logic. As used in this document, "each" refers to each member of a set or each member of a subset of a set.

Figure 4:
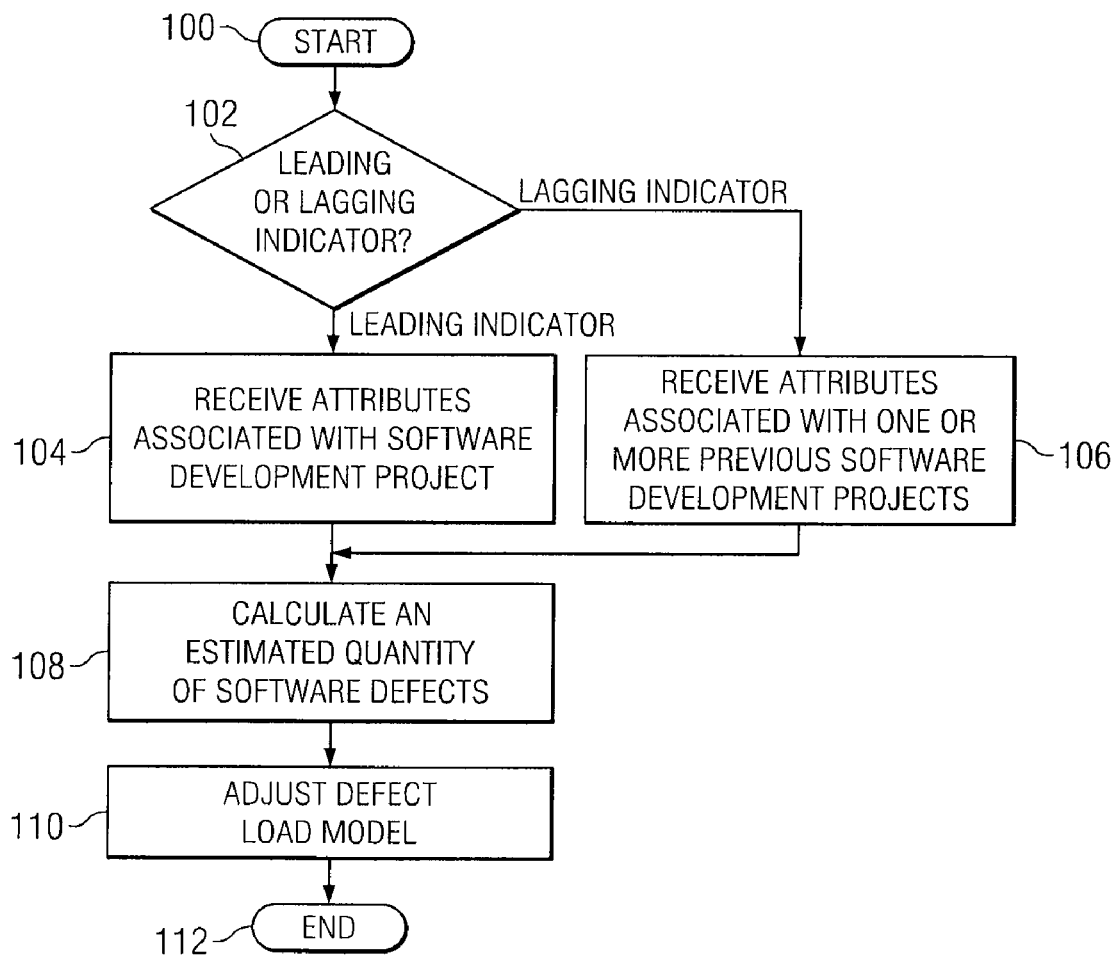
FIG. 4 is a flowchart showing a series of actions that may be performed by the software defect forecasting system of FIG. 2.

FIG. 4 shows one embodiment of a series of actions that may be performed by software defect forecast tool 22. In act 100, the process is initiated.

In act 102, a leading indicator or a lagging indicator may be used to estimate the anticipated quantity of software defects. If use of a leading indicator is desired, processing continues at act 104. If use of a lagging indicator is desired, processing continues at act 106.

In act 104, software defect forecast tool 22 may receive a number of attributes associated with current software project 24. Attributes may include product attributes, hardware attributes, personnel attributes, and/or project attributes. In one embodiment, these attributes may be received and processed through a commercial off-the-shelf software package, such as the COCOMO software package. Each of these attributes may comprise a subjective assessment of various aspects of software development project. For example, the COCOMO software package may provide entry fields for various subsidiary attributes of project attributes including use of software tools, application of software engineering methods, or required development schedule. Entry fields for these subsidiary attributes may include a rating value that is subjectively determined by a user of the software defect forecast tool 22. The COCOMO software package may use these attribute values and subsidiary attribute values to determine an overall score for current software project 24 referred to as an effort multiplier (EM). The Rwk_Hrs_per_Defect variable may be calculated from the effort multiplier value as described above.

In act 106, software defect forecast tool 22 uses a lagging indicator to estimate the quantity of software defects that may be incurred by current software project 24. The lagging indicator provides the Rwk_Hrs_per_Defect variable according to measured values from previous software development projects 28 or from measured values taken from work already performed during the current software project 24. If an estimated quantity of software defects are desired prior to the beginning of current software project 24, measured values may be determined from one or more previous software development projects 28. Measured values may be taken from the current software project 24 if an estimated quantity of software defects are desired during execution of current software project 24. For example, it has been estimated that current software project 24 will require ten months to complete in which three months have elapsed since its beginning. Software defect forecast tool 22 may be executed at this time to provide an updated assessment of the quantity of software defects that may be incurred by current software project 24.

In act 108, software defect forecast tool 22 calculates an estimated quantity of software defects for current software project 24. This value may be calculated at any time during the execution of current software project 24. In one embodiment, this value may be calculated prior to the beginning of current software project 24. In this manner, relatively accurate costs and other associated factors may be assessed prior to the beginning of current software project 24. For example, the estimated quantity of software defects may provide enhanced accuracy of the financial forecast of current software project 24 in some embodiments. The forecast may in turn, provide control over various aspects of current software project 24 to maintain its costs within realizable bounds in some embodiments.

In act 110, the defect load model may be adjusted to empirically approximate the quantity of defects that should be incurred as development progresses (for example each week or month), or during each development phase of the current software project 24. The defect load model may incorporate any suitable function that approximates the behavior of current software project 24 or one or more previous software development projects 28. In one embodiment, the defect load model may be adjusted by manipulating the values of various constants used to calculate an estimated quantity of expected software defects, which may be allocated over time (for example by week, month, or development phase).

In act 112, the process ends.

Although several embodiments have been illustrated and described in detail, it will be recognized that substitutions and alterations are possible without departing from the spirit and scope of the present disclosure, as defined by the following claims.

What is claimed is:

1. A software defect forecasting system comprising:
a user interface; and
one or more processors to execute a software forecasting tool coupled to the user interface, the software forecasting tool configured to:
receive a plurality of attributes associated with a current software development project in which a software product is developed over a period of time, the plurality of attributes received prior to a beginning of the current software development project;
estimate, from the plurality of attributes, a quantity of defects in the software product according to a lagging indicator collected from one or more previous software projects, the lagging indicator comprising a value indicating rework hours per defect derived from the one or more previous software projects, the rework hours comprising time spent on resolving the defect; and
display the estimated quantity of defects on the user interface.

2. The software defect forecasting system of claim 1, wherein the software forecasting tool is operable to estimate the quantity of defects according to a leading indicator, the leading indicator comprising an effort multiplier value calculated from one or more attributes of the current software development project.

3. The software defect forecasting system of claim 2, wherein the effort multiplier value is calculated by a cost estimation software program.

4. The software defect forecasting system of claim 2, wherein the one or more attributes comprise at least one of product attributes, hardware attributes, personnel attributes, or project attributes.

5. The software defect forecasting system of claim 1, wherein the software forecasting tool is operable to empirically match the estimated quantity of defects to a defect load model and estimate a defect rate associated with the current software development project according to the empirically matched quantity of defects.

6. The software defect forecasting system of claim 5, wherein the defect load model is based upon a logarithmic function.

7. The software defect forecasting system of claim 1, wherein the software forecasting tool is further operable to determine a forecast for the current software development project from the estimated quantity of defects.

8. A method comprising:
receiving a plurality of attributes associated with a current software development project in which a software product is developed over a period of time, the plurality of attributes received prior to a beginning of the current software development project; and
estimating, from the plurality of attributes, a quantity of defects in the software product according to a lagging indicator collected from one or more previous software projects, the lagging indicator comprising a value indicating rework hours per defect derived from the one or more previous software projects, the rework hours comprising time spent on resolving the defect; and
displaying the estimated quantity of defects on a user interface.

9. The method of claim 8, wherein the estimating of the quantity of defects further comprises estimating the quantity of defects according to a leading indicator, the leading indicator comprising an effort multiplier value calculated from one or more attributes of the current software development project.

10. The method of claim 9, wherein the one or more attributes comprise at least one of product attributes, hardware attributes, personnel attributes, or project attributes.

11. The method of claim 8, further comprising:
empirically matching the estimated quantity of defects to a defect load model and estimating a defect rate associated with the current software development project according to the empirically matched quantity of defects.

12. The method of claim 11, wherein the defect load model is based upon a logarithmic function.

13. A non-transitory computer-readable storage device storing instructions that, when executed by one or more processors, configure the one or more processors to:
receive a plurality of attributes associated with a current software development project in which a software product is developed over a period of time, the plurality of attributes received prior to a beginning of the current software development project;
estimate, from the plurality of attributes, a quantity of defects in the software product according to a lagging indicator collected from one or more previous software projects, the lagging indicator comprising a value indicating rework hours per defect derived from the one or more previous software projects, the rework hours comprising time spent on resolving the defect; and
display the estimated quantity of defects on a user interface.

14. The storage device of claim 13, wherein the software forecasting tool is operable to estimate the quantity of defects according to a leading indicator, the leading indicator comprising an effort multiplier value calculated from one or more attributes of the current software development project.

15. The storage device of claim 14, wherein the one or more attributes comprise at least one of product attributes, hardware attributes, personnel attributes, or project attributes.

16. The storage device of claim 13, wherein the instructions are further configured to:
empirically match the estimated quantity of defects to a defect load model and estimate a defect rate associated with the current software development project according to the empirically matched quantity of defects.

17. The storage device of claim 16, wherein the defect load model is based upon a logarithmic function.

18. A software defect forecasting system, comprising:
memory to store information associated with software development projects; and
one or more processors to execute a software forecasting tool, the software forecasting tool configured to:
receive a plurality of attributes associated with a current software development project in which a software product is to be developed over a period of time, the plurality of attributes received prior to a beginning of the current software development project;
determine whether a lagging indicator or a leading indicator will be used to estimate a quantity of defects in the software product, the lagging indicator collected from one or more previous software development projects and the lagging indicator comprising a value indicating rework hours per defect derived from the one or more previous software development projects, the rework hours comprising time spent on resolving the defect, and the leading indicator comprising an effort multiplier value calculated from one or more attributes of the current software development project;
responsive to a first indication that the lagging indicator will be used, estimate, using the plurality of attributes, the quantity of defects in the software product according to the lagging indicator;
responsive to a second indication that the leading indicator will be used, estimate, using the plurality of attributes, the quantity of defects in the software product according to the leading indicator; and
display the estimated quantity of defects on the user interface.

\* \* \* \* \*

UNITED STATES PATENT AND TRADEMARK OFFICE
CERTIFICATE OF CORRECTION

| | |
|---|---|
| PATENT NO. | : 8,296,724 B2 |
| APPLICATION NO. | : 12/354605 |
| DATED | : October 23, 2012 |
| INVENTOR(S) | : Joe H. Lindley |

It is certified that error appears in the above-identified patent and that said Letters Patent is hereby corrected as shown below:

On the Title page, in column 2, under "Other Publications", line 4, delete "al." and insert --al.,--, therefor In the Specification In column 2, line 41, delete "its", insert --it--, therefor Signed and Sealed this
Fifteenth Day of September, 2015

Michelle K. Lee
*Director of the United States Patent and Trademark Office*